United States Patent [19]

Moellering

[11] 3,826,900

[45] July 30, 1974

[54] CORDLESS SCANNING PROBE

[75] Inventor: Edgar E. Moellering, Kettering, Ohio

[73] Assignee: The National Cash Register Company, Dayton, Ohio

[22] Filed: Oct. 13, 1972

[21] Appl. No.: 297,353

[52] U.S. Cl. .... 235/61.11 E, 250/568, 340/146.3 Z, 235/61.11 D
[51] Int. Cl. .... G06k 7/14, G01n 21/30, G06k 9/14, G06k 19/06
[58] Field of Search ......... 340/149 A, 224, 146.3 Z; 235/61.7 B, 61.11 E, 61.11 D, 61.11 R, 61.12 N, 61.9 R; 250/219 DC

[56] References Cited
UNITED STATES PATENTS

| 3,559,175 | 1/1971 | Pomeroy | 235/61.7 B |
| 3,579,221 | 5/1971 | Ashley | 340/277 |
| 3,671,722 | 6/1972 | Christie | 235/61.12 N |
| 3,673,416 | 6/1972 | Berler | 250/219 DC |
| 3,688,087 | 8/1972 | Howard | 235/61.9 R |
| 3,713,125 | 1/1973 | Miller | 340/224 R |
| 3,716,699 | 2/1973 | Eckert | 235/61.11 E |

Primary Examiner—Daryl W. Cook
Assistant Examiner—Robert M. Kilgore
Attorney, Agent, or Firm—J. T. Cavender; Albert L. Sessler, Jr.; Edward Dugas

[57] ABSTRACT

In the present invention an optical decoding system employs a hand-held, optical probe scanner, for optically reading coded information from labels affixed to pieces of merchandise. The optically read code is converted into electrical energy and transmitted by a radio transmitter located within the probe to a local receiver for processing. The processed signals are then used to control a registering business machine such as a sales register, accounting machine, or other such device.

2 Claims, 4 Drawing Figures

PATENTED JUL 30 1974
3,826,900
SHEET 1 OF 2
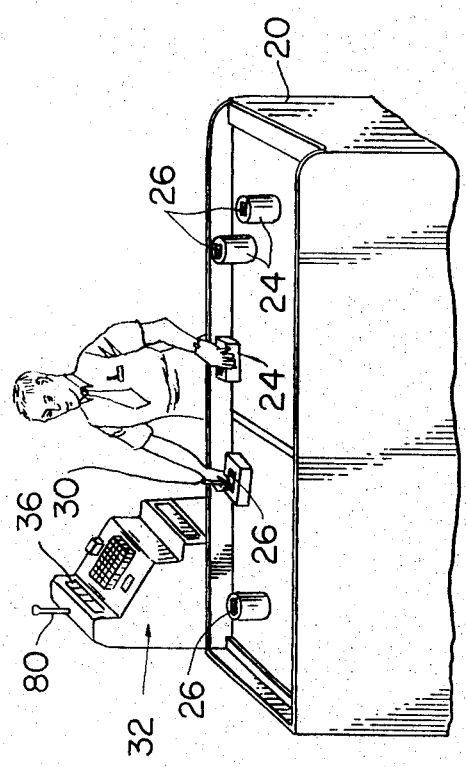
FIG. I
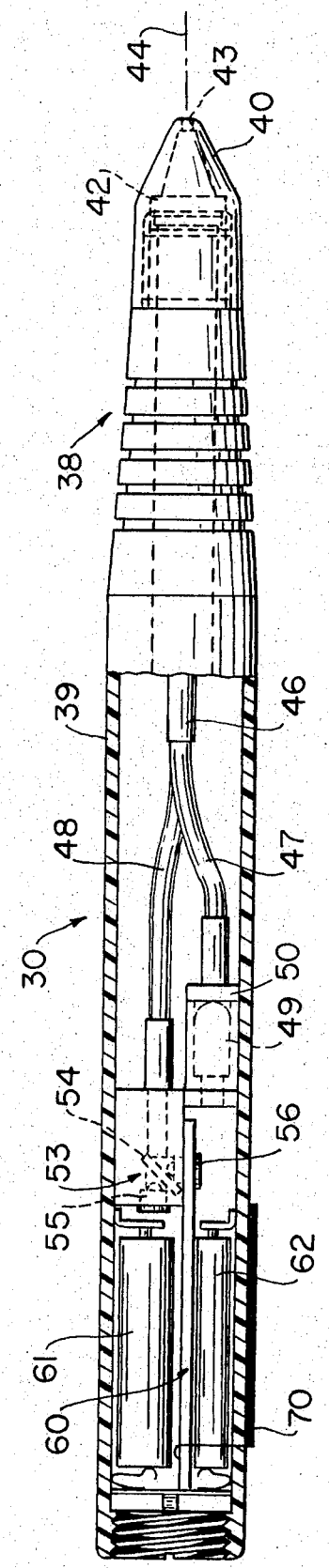
FIG. 2

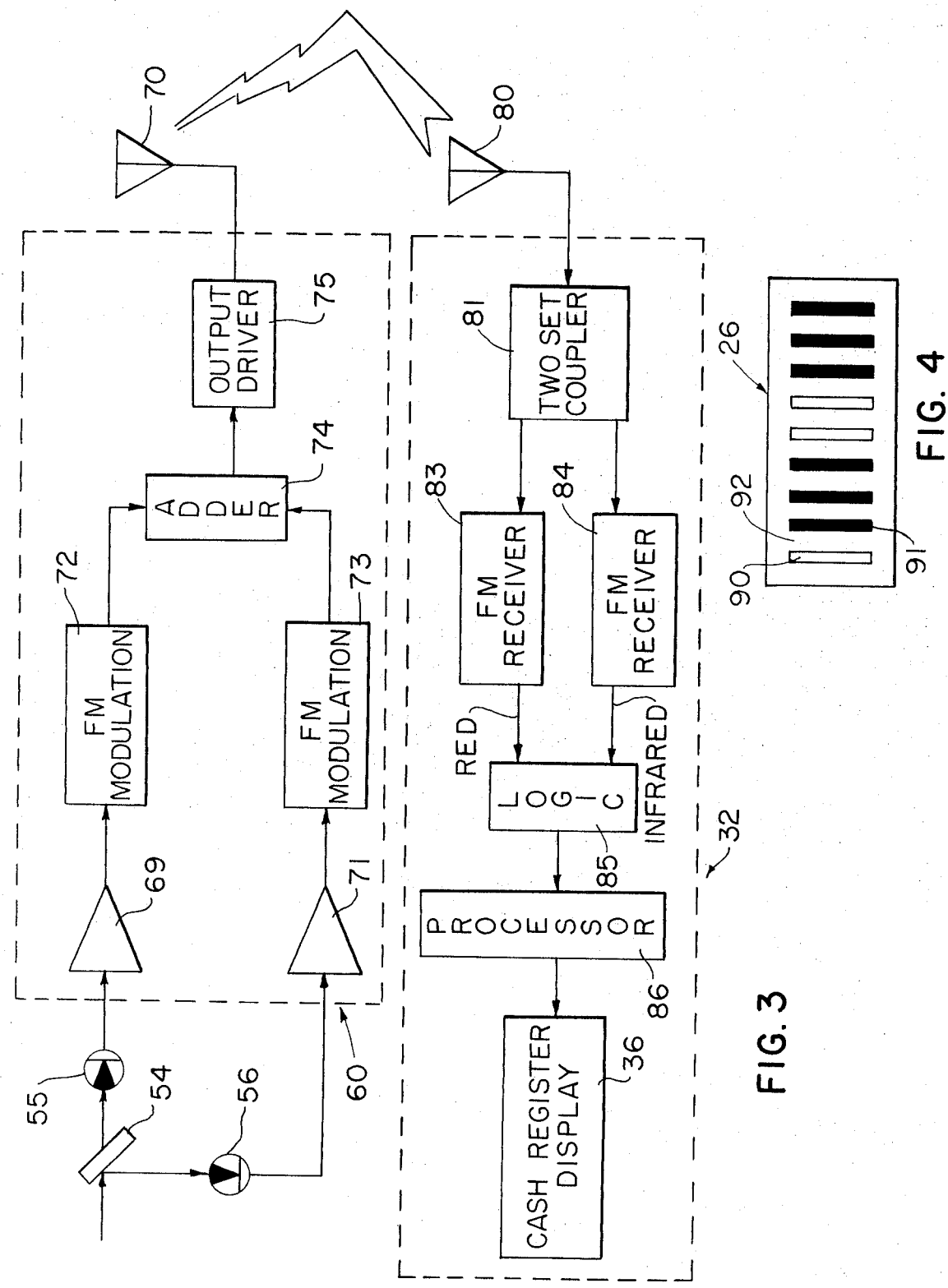

CORDLESS SCANNING PROBE

BACKGROUND OF THE INVENTION

This invention is an improvement on the system disclosed in U.S. Pat. No. 3,584,779, entitled, "Optical Data Sensing System", by C. W. Kessler et al., which patent is assigned to The National Cash Register Company, the assignee of the present invention. In the system disclosed in the referenced patent there is provided a hand-held, optical probe, which probe is scribed across a label having imprinted thereon color-coded bars. The light reflections from the coded bars are coupled, by means of a flexible fiber optic bundle, to electronic circuitry for converting the optical reflections into electrical signals. The converted electrical signals are then used to operate, for example, a registering machine. An operator, while supporting the probe and fiber bundle, must scribe the probe across the coded label. The fiber bundle, whether long or short, inhibits the handling of the probe. The registering machine and its associated electronics is physically tied to the probe thereby limiting its position to the immediate area of the operator. If the fiber bundle is made long to provide increased mobility for the probe the bundle gets heavier, thereby causing an unbalance in the probe which unbalance causes operator fatigue. It therefore would be highly desirable to remove the constraints of the optical bundle while maintaining all the advantages of the scanning probe. The present invention is directed to such a result.

SUMMARY OF THE INVENTION

The present invention is directed to a hand-held, optical probe designed to detect coded information as the probe is scribed across a coded label and to transmit signals indicative of the detected code to a local receiver. The receiver is connected to an information utilizing device, such as a registering business machine, for use thereby, in accordance with the requirements of the application. In the preferred embodiment of the invention the code takes the form of at least two dissimilar reflections which reflections are detected through a pair of photosensitive diodes, each being sensitized to respond to one of the two reflections used in the code.

From the foregoing it can be seen that it is a principal object of the present invention to provide an improved optical decoding system.

It is a further object of the present invention to provide a decoding system utilizing an optical scanner which is not physically connected to the recording or display apparatus.

It is another object of the present invention to provide an optical decoding system wherein the operator has complete freedom of movement with respect to the recording or display apparatus.

These and other objects of the present invention will become more apparent when taken in conjunction with the following description and attached drawings, which drawings form a part of the invention, and wherein like reference characters indicate like parts.

BRIEF DESCRIPTION OF THE DRAWINGS

FIG. 1 is a general view, in perspective, of the apparatus of this invention being used at a checkout counter;

FIG. 2 is a partially sectioned view of the hand-held, optical probe scanner of the present invention;

FIG. 3 is a schematic diagram, partially in block diagram form, of the optical and electronic portions of the present invention; and FIG. 4 is a representative type of coded label to be used in conjunction with the optical probe scanner.

DESCRIPTION OF THE PREFERRED EMBODIMENT

FIG. 1 is a general view of the system of this invention being used at a merchandise check out counter. The counter 20 supports items of merchandise 24 to which are affixed coded labels 26 containing data such as the price of the merchandise, inventory control, and/or other desired accounting data. The operator scribes the hand-held probe 30 across the label 26 in either direction. The hand-held probe transforms the coded data into radio signals which signals are received by a registering business machine or terminal 32 wherein a part of the data, generally the price, is displayed by a display 36.

Referring now to FIG. 2 wherein the probe 30 of FIG. 1 is shown in more detail, a hollow cylinder 39 forms the main probe body. A serrated section 38 provides a slip-proof grip for the operator. The reading end 40 having an opening 43 supports a lens 42 in a fixed position with respect to an optic axis 44. Reflected light passing through lens 42 is imaged onto the end of a fiber optical bundle 46. The fiber bundle 46 is formed from a plurality of fibers which are grouped together from two smaller bundles 47 and 48. Bundle 47 is directed to a light source 49. A condensing lens 50 may be used to focus the light from the source 49 onto the ends of the fiber if increased intensity is needed. In most applications the condensing lens can be omitted.

The second bundle 48 directs the reflected light from the lens 42 onto a transducer means 53, which is comprised of a beam splitter 54 which may be a dichroic mirror that functions to pass infrared frequencies while reflecting other frequencies. The passed infrared reflections are detected by an infrared photodetector 55. The reflected light from the surface of mirror 54 is directed to photodetector 56. It is also possible to use a beam splitter 54 wherein a portion of the light received by the splitter is passed with the remainder being reflected. Filters corresponding to colors used in the code are then placed in front of each photosensitive device assigned to detect one particular color. This arrangement is described in greater detail in the previously-cited U.S. Pat. No. 3,584,779. It will also be obvious that although only two photodetectors are shown for detecting two different reflections that more reflections (colors) can be used in the code with a corresponding increase in the number of photodetectors and associated equipment. The outputs from the photodetectors 55 and 56 are electrical signals corresponding to the light reflections received through the lens 42. A transmitter means 60 receives the electrical signals from the photodetectors 55 and 56 and transmits signals indicative of the electrical signals via an antenna 70 formed on the outer body surface of the housing 39. Batteries 61 and 62 provide power for the light source 49 and the transmitter means 60.

Referring to FIG. 3, the electrical signals from photodetectors 55 and 56 are fed to amplifiers 69 and 71, respectively. The amplifiers boost the electrical signals and feed them to FM modulators 72 and 73. Each modulator is set to a different center frequency while frequencies are separated sufficiently so as to prevent interference. The frequency modulated output signals are then combined in adder 74. The combined signals are fed to the output driver stage 75 for transmission on antenna 70.

A receiving antenna 80 directs the received signals to a two-set coupler 81, which divides the signal while providing an impedance match between the antenna and the inputs of FM receivers 83 and 84. The outputs from the receivers are fed to a logic means 85, which means converts the received signals into binary pulses corresponding to the coded data. The logic means outputs the digital signals to a processor 86. The processor uses the digital signals for calculations and for conversion to decimal form. The converted signals are displayed by the display 36, and may additionally be utilized in accordance with the requirements of the business, as for example in the case of a price label, providing item price information to enable the total amount owed by a customer to be determine. Means for performing the various conversions and displays are not shown in detail because they are well known in the art and because they vary from application to application.

In FIG. 4 a coded label 26 is shown formed from a standard semigloss white paper 92 upon which is printed a plurality of color bars. The bars 91 are shown dark and are colored black, while the blank bars 90 are colored green. The white sections reflect steadily through the infrared and visible spectrums while the black offers no reflection in either spectrum. The color green does reflect on the infrared but does not reflect in the visible, except for a small amplitude reflection at the green frequency. By combining the outputs of the photodetectors it is possible to determine which section is being scanned by the pen.

Multiple registers using the present system can be placed within reasonable proximity of each other without causing interference by properly selecting the carrier frequencies such that no overlap occurs. The strength of the transmitted signals is kept low so as to limit the range of the probes.

While there has been shown what is considered to be the preferred embodiment of the invention the same is not to be taken as a limitation, the spirit and scope of the invention being limited by the scope of the appended claim.

What is claimed is:

1. In combination with a registering business machine:

a probe having a reading end adapted to be scribed across the coded data of a record marker which record marker is attached to a unit of merchandise;

illumination means for illuminating said coded data;

transducer means affixed to said probe for converting the reflection of said coded data into corresponding electrical signals as said probe is scribed across said coded data, said transducer means being comprised of, a first photodetector means responsive to certain portions of the coded data for providing an electrical signal each time the reading end of said probe is scribed across said coded data, a second photodetector means responsive to the remaining portions of the coded data for providing an electrical signal each time the reading end of said probe is scribed across said coded data;

modulation means for receiving the signals from said first and said second photodetector means and for providing modulating signals, corresponding to said received signals, said modulation means being comprised of, a first frequency modulated oscillator, the output frequency of which is proportional to the electrical signal from said first photodetector means, a second frequency modulated oscillator, the output frequency of which is proportional to the electrical signal from said second photodetector means;

means for combining the output frequency signals from said first and said second frequency modulated oscillators and for feeding said combined signals to said transmitter means;

transmitter means for transmitting radio waves proportional to said corresponding electrical signals; and receiver means for receiving said transmitted signals and for providing said signals to said information utilizing device for registering therein.

2. An apparatus for detecting data from a record member bearing coded data comprising:

a probe having a reading end for scribing across the coded data;

means for applying radiation to said coded data;

transducer means affixed to said probe for transforming the radiation reflected from said coded data into corresponding electrical signals, as said probe is scribed across the coded data, said transducer means being comprised of, a first photodetector means responsive to certain portions of the coded data for providing an electrical signal each time the reading end of the probe is scribed across the coded data, a second photodetector means responsive to the remaining portions of the coded data for providing an electrical signal each time the reading end of the probe is scribed across the coded data;

modulation means for receiving the signals from said first and said second photodetector means and for providing modulating signals, corresponding to said received signals, said modulation means being comprised of, a first frequency modulated oscillator, the output frequency of which is proportional to the electrical signal from said first photodetector means, a second frequency modulated oscillator, the output frequency of which is proportional to the electrical signal from said second photodetector means;

means for combining the output frequency signals from said first and said second frequency modulated oscillators and for providing a combined signal;

transmitter means for receiving said combined signals and for transmitting radio waves distinctive of said combined signals;

receiver means for receiving said transmitted radio waves;

logic means for converting said received radio waves into digital signals;

processor means for converting said digital signals into decimal signals; and video display means for converting said received radio waves into video signals indicative of said coded data.

* * * * *